United States Patent
Fermy et al.

(10) Patent No.: US 7,218,908 B2
(45) Date of Patent: May 15, 2007

(54) INTEGRATED CIRCUIT ABLE TO OPERATE IN ACTIVE AND INACTIVE MODES AND A DEVICE INCLUDING IT

(75) Inventors: Alain Fermy, La Garenne Colombes (FR); Dominique Castel, Clichy (FR)

(73) Assignee: Alcatel, Paris (FR)

( * ) Notice: Subject to any disclaimer, the term of this patent is extended or adjusted under 35 U.S.C. 154(b) by 832 days.

(21) Appl. No.: 09/905,892

(22) Filed: Jul. 17, 2001

(65) Prior Publication Data

US 2002/0011643 A1    Jan. 31, 2002

(30) Foreign Application Priority Data

Jul. 18, 2000    (FR) .................................... 00 09400

(51) Int. Cl.
*H04B 1/28* (2006.01)
(52) U.S. Cl. ...................................... 455/333; 455/572
(58) Field of Classification Search ................ 455/333, 455/572
See application file for complete search history.

(56) References Cited

U.S. PATENT DOCUMENTS

| 4,989,261 | A  |   | 1/1991 | Lee ........................ 455/127.1 |
| 5,551,075 | A  | * | 8/1996 | Caux et al. ................. 455/333 |
| 6,026,287 | A  | * | 2/2000 | Puechberty et al. ........ 455/333 |
| 6,226,509 | B1 | * | 5/2001 | Mole et al. ................. 455/302 |

FOREIGN PATENT DOCUMENTS

EP    0 865 167 A2    9/1998
EP    0 939 495 A1    9/1999

* cited by examiner

*Primary Examiner*—Quynh H. Nguyen
(74) *Attorney, Agent, or Firm*—Sughrue Mion, PLLC

(57) ABSTRACT

An integrated circuit for a portable electronic device able to operate in an active mode or in an inactive mode and including a functional module implementing control functions of the device in the active mode and the inactive mode, controlling switching of the device to the active mode and including its own power supply unit, independent of power supply arrangements of the circuit in which it is integrated, which includes one or more devices for electrically isolating the module and its own power supply unit from the remainder of the integrated circuit.

12 Claims, 1 Drawing Sheet

INTEGRATED CIRCUIT ABLE TO OPERATE IN ACTIVE AND INACTIVE MODES AND A DEVICE INCLUDING IT

CROSS-REFERENCE TO RELATED APPLICATIONS

This application is based on French Patent Application No. 00 09 400 filed Jul. 18, 2000, the disclosure of which is hereby incorporated by reference thereto in its entirety, and the priority of which is hereby claimed under 35 U.S.C. §119.

BACKGROUND OF THE INVENTION

1. Field of the Invention

The present invention relates to portable electronic instruments and devices having an active or normal operating mode and an inactive, waiting or standby state or mode in which only basic functions are operational; it relates more particularly to radio communication devices, in particular cellular radio communication devices.

The invention provides an integrated circuit for use in a device of the type previously cited having a standby mode characterized by very low power consumption and a portable or mobile radio communication device including that kind of integrated circuit.

2. Description of the Prior Art

An essential parameter and constant concern for designers and manufacturers of portable instruments or devices incorporating their own electrical power supply is reducing their electrical power consumption and thereby improving their autonomy (the duration of operation before replacing or recharging the battery).

Given that constraint, manufacturers of such devices soon defined, in addition to ON and OFF states, a "standby" mode of operation corresponding to a reduced mode of operation in the ON state in which power consumption is low and only a few essential basic functions are active (internal clocks, active registers, etc.).

This applies to devices including telecommunication devices, and in particular to mobile or cellular telephones.

For example, a digital baseband dedicated circuit basic function (the 32 kHz module) is always active in a GSM (Global System for Mobile communications) or UMTS (Universal Mobile Telecommunication System), also known as a third generation terminal, which is in the ON state.

The 32 kHz module mainly consists of an oscillator, registers and counters, and remains on and active in the ON/standby (low power consumption) state or mode of operation. It maintains the GSM time locally when the main oscillator of the voltage-controlled device is off and no radio link is set up. It also "wakes up" the terminal, i.e. commands its return to the active mode after each period on standby.

The 32 kHz module is at present integrated into the baseband dedicated circuit and it is therefore necessary for that circuit to be on even during periods in which the terminal is in the standby mode.

Although it represents a penalty, this powering of a complete circuit of which only one particular function is effectively active can at present be accepted since the static leakage per transistor is of the order of picoamperes/micron.

The baseband dedicated circuit generally integrates less than 10 million transistors and the overall static leakage current for the whole of the integrated circuit is therefore less than 100 microamperes. These values correspond to CMOS transistors of up to 0.25 micron, or possibly up to 0.18 micron with special arrangements.

However, new generation CMOS integrated circuits, with etching or track widths of the order of 0.10 micron, have a static leakage of approximately 20 nanoamperes/micron (see in particular "International Technology Roadmap for Semiconductors", 1999, SEMATECH). The resulting overall static leakage for the whole of the GSM baseband circuit could achieve values of the order of 100 milliampere, which would be greater than the power consumption in the active mode and during a call.

To attempt to overcome the aforementioned drawbacks, it has been proposed, in particular in the document EP-A-0 939 495, to remove the 32 kHz module from the digital baseband dedicated circuit and implement it as a separate component distinct from the aforementioned dedicated circuit or to integrate it into another dedicated circuit of smaller size, such as the power supply management circuit.

This separates off the "GSM time" function and partially implements it in two separate circuits, namely the power supply management circuit and the digital baseband circuit, and therefore leads to a new design of the architecture of the two circuits.

This necessarily results in exchanges of information between the two circuits, in particular to update or resynchronize the GSM time; these exchanges of information are relatively difficult to manage.

One object of the present invention is to propose a solution that significantly reduces the power consumption during periods in which the terminal is in the inactive or standby mode but avoids the drawbacks of the solution previously cited.

SUMMARY OF THE INVENTION

To this end, the present invention provides an integrated circuit for a portable electronic device able to operate in an active mode or in an inactive mode and including a functional module implementing control functions of the device in the active mode and the inactive mode, controlling switching of the device to the active mode and including its own power supply unit, independent of power supply arrangements of the circuit in which it is integrated, which includes one or more devices for electrically isolating the module and its own power supply unit from the remainder of the integrated circuit.

The invention therefore proposes to retain the module in the integrated circuit concerned, which avoids any significant modification of its architecture, whilst providing it with a separate power supply and isolating it from its environment to prevent any propagation of energy to the remainder of the circuit when the latter is not powered up.

The invention will be understood better from the following description, which relates to one preferred embodiment explained by way of non-limiting example with reference to the accompanying diagrammatic drawings.

DETAILED DESCRIPTION OF THE PREFERRED EMBODIMENT

Figures 1, 2:
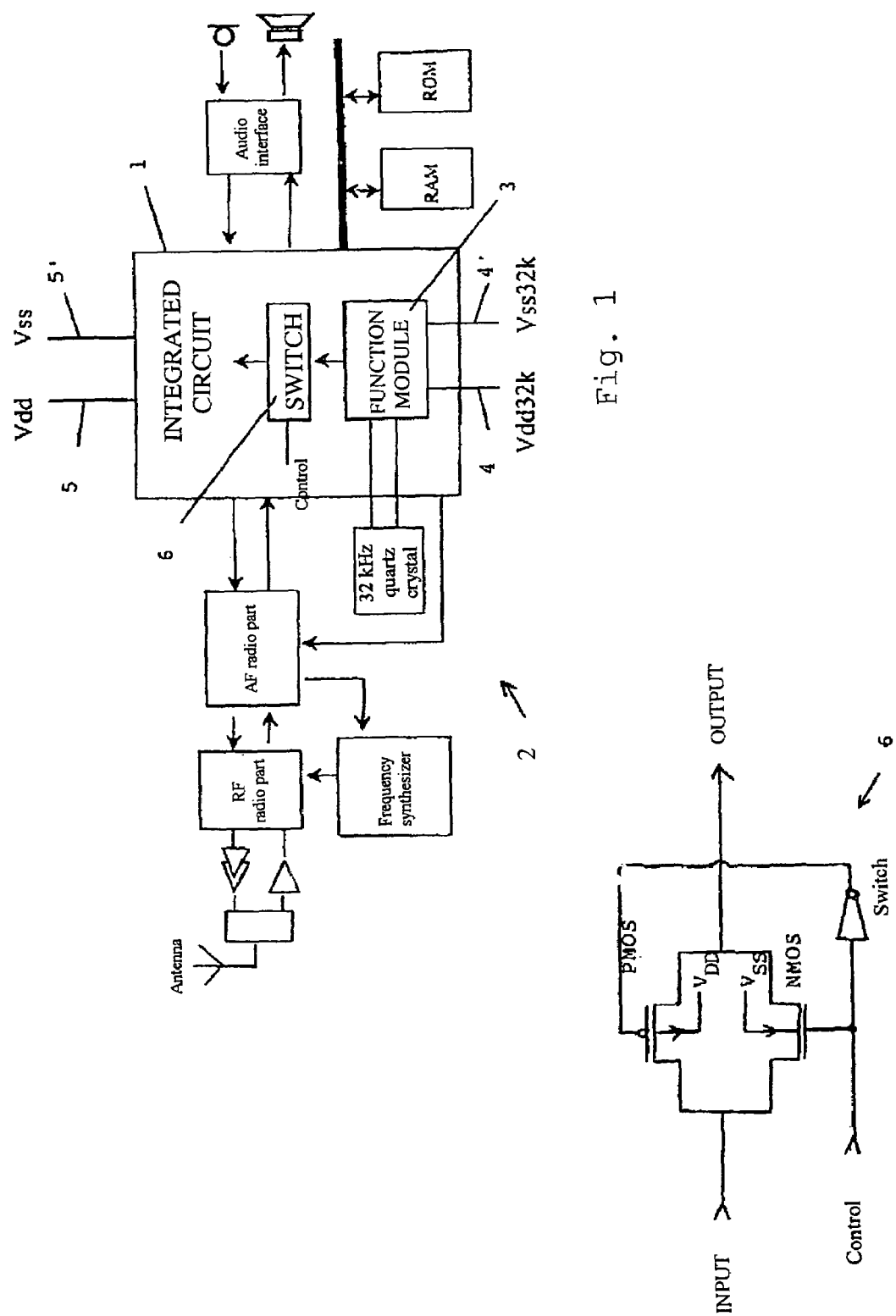
FIG. 1 is a block diagram of a mobile telephone including an integrated circuit according to the invention.
FIG. 2 is a block diagram of an electronic switch forming part of the integrated circuit shown in FIG. 1.

FIG. 1 of the accompanying drawing shows a mobile telephone in accordance with the present invention consisting mainly of a radio transceiver, a power supply unit, a user interface and a digital baseband function.

The digital baseband function performs various processing tasks, for example, when receiving: synchronization with the network, demodulating bursts from the radio function, decrypting, de-interleaving, channel decoding, processing of signaling or decoding of speech. When sending, the digital baseband function handles: coding of speech transmitted by the radio function, channel coding, interleaving, forming bursts to be transmitted to the radio function and encrypting, for example.

The digital baseband function therefore includes an interface with the radio function for sending and receiving bursts of speech, data or signaling, and an interface with an audio converter to which a microphone and a loudspeaker are connected.

The integrated circuit in accordance with the invention is the main component implementing the digital baseband function. It includes a functional module for controlling the mobile telephone in the active or inactive mode. According to the invention, the module 3 includes its own power supply unit 4, 4' independent of the power supply unit 5, 5' of the circuit 1 in which it is integrated, the latter including one or more devices 6 for electrically isolating said module 3 and said power supply unit 4, 4' from the remainder of the integrated circuit 1.

The power supply unit specific to the module 3 preferably consists of a dedicated terminal or positive ($V_{DD}$) patch 4 and a dedicated terminal or negative ($V_{SS}$) patch 4', connected to corresponding power supply buses connected to the various basic components of the module 3.

An electronic switch or electronic switches advantageously provide the electrical isolation.

FIG. 2 shows by way of non-limiting example a switch 6 implemented by means of a PMOS transistor and an NMOS transistor.

When the control signal of the switch 6 is at 1, OUTPUT=INPUT.

When the control signal is at 0, the OUTPUT-INPUT connection is broken.

Depending on the state of its control signal, the switch 6 authorizes or prevents the transfer of output signals of the module 3.

Transfer is authorized if the integrated circuit 1 is powered up, and therefore in its active mode.

In the inactive or standby mode, the power supply voltages $V_{DD}$ and $V_{SS}$ of the integrated circuit 1 are not enabled and the output of the module 3 must then be isolated by opening the switch 6 to prevent self-powering of the remainder of the integrated circuit 1.

In the preferred application of the invention to a radio communication device 2, such as a GSM mobile telephone, the integrated circuit 1 corresponds to the dedicated digital baseband circuit and the functional module 3 corresponds to a module integrating a low-frequency clock and forming part of said circuit 1, for example the 32 kHz module.

As shown in FIG. 1 of the accompanying drawing, the present invention also provides a portable or mobile radio communication device 2, in particular a GSM cellular mobile telephone, which includes a digital baseband circuit 1 as described above.

Of course, the invention is not limited to the embodiment described. Modifications are possible, in particular from the point of view of the constitution of the various components or through substituting technical equivalents, without in so doing departing from the scope of the protection afforded to the invention.

There is claimed:

1. An integrated circuit for a portable electronic device able to operate in an active mode or in an inactive mode and including a functional module implementing control functions of said device in said active mode and said inactive mode, controlling switching of said device to said active mode and including its own power supply unit, independent of power supply arrangements of the circuit in which it is integrated, which includes one or more electronic switches responsive to a control signal for electrically isolating said module and its own power supply unit from the remainder of said integrated circuit in said inactive mode.

2. An integrated circuit for a portable electronic device able to operate in an active mode or in an inactive mode and including a functional module implementing control functions of said device in said active mode and said inactive mode, controlling switching of said device to said active mode and including its own power supply unit, independent of power supply arrangements of the circuit in which it is integrated, which includes one or more devices for electrically isolating said module and its own power supply unit from the remainder of said integrated circuit;
   wherein said power supply arrangements comprise a separate power supply unit connected to said integrated circuit, and
   wherein said power supply unit of said module has a dedicated positive patch or terminal and a dedicated negative patch or terminal connected to corresponding power supply buses.

3. The integrated circuit claimed in claim 2, wherein said electrical isolation is provided by an electronic switch or electronic switches.

4. The integrated circuit claimed in claim 3, in the form of a digital baseband dedicated circuit.

5. The integrated circuit claimed in claim 4 wherein said functional module corresponds to a module integrating a low-frequency clock.

6. A portable or mobile radio communication device, such as a GSM and/or UMTS cellular telephone, able to operate in an active mode or in an inactive mode and including an integrated circuit including a functional module implementing control functions of said device in said active mode and said inactive mode, controlling switching of said device to said active mode and including its own power supply unit, independent of power supply arrangements of the circuit in which it is integrated, which includes one or more electronic switches responsive to a control signal for electrically isolating said module and its own power supply unit from the remainder of said integrated circuit in said inactive mode.

7. A portable or mobile radio communication device, such as a GSM and/or UMTS cellular telephone, able to operate in an active mode or in an inactive mode and including an integrated circuit including a functional module implementing control functions of said device in said active mode and said inactive mode, controlling switching of said device to said active mode and including its own power supply unit, independent of power supply arrangements of the circuit in which it is integrated, which includes one or more devices for electrically isolating said module and its own power supply unit from the remainder of said integrated circuit,
   wherein said power supply arrangements comprise a separate power supply unit connected to said integrated circuit, and
   wherein said power supply unit of said module has a dedicated positive patch or terminal and a dedicated negative patch or terminal connected to corresponding power supply buses.

8. The portable or mobile radio communication device claimed in claim 7, wherein said electrical isolation is provided by an electronic switch or electronic switches.

9. The portable or mobile radio communication device claimed in claim 8, in which said integrated circuit is in the form of a digital baseband dedicated circuit.

10. The integrated circuit claimed in claim 9 wherein said functional module corresponds to a module integrating a low-frequency clock.

11. An integrated circuit for a portable electronic device able to operate in an active mode or in an inactive mode and including a functional module implementing control functions of said device in said active mode and said inactive mode, controlling switching of said device to said active mode and including its own power supply unit, independent of power supply arrangements of the circuit in which it is integrated, which includes one or more devices for electrically isolating said module and its own power supply unit from the remainder of said integrated circuit, wherein said power supply arrangements comprise a separate power supply unit (5', 5) connected to the integrated circuit (1).

12. A portable or mobile radio communication device, such as a GSM and/or UMTS cellular telephone, able to operate in an active mode or in an inactive mode and including an integrated circuit including a functional module implementing control functions of said device in said active mode and said inactive mode, controlling switching of said device to said active mode and including its own power supply unit, independent of power supply arrangements of the circuit in which it is integrated, which includes one or more devices for electrically isolating said module and its own power supply unit from the remainder of said integrated circuit, wherein said power supply arrangements comprise a separate power supply unit (5', 5) connected to the integrated circuit (1).

* * * * *